United States Patent
Chang et al.

(10) Patent No.: US 6,272,561 B1
(45) Date of Patent: Aug. 7, 2001

(54) SOUND BLASTER INTERFACE CARD AUTO-DETECTION METHOD

(75) Inventors: Vam Chang, Taipei (TW); Kingboard Ma, Shang Hai (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/225,308

(22) Filed: Jan. 5, 1999

(30) Foreign Application Priority Data

Oct. 23, 1998 (TW) .................................................. 87117570

(51) Int. Cl.[7] .............................. G06F 3/00; G06F 13/12; G06F 13/38; G06F 13/00; G06F 1/24
(52) U.S. Cl. .................................. 710/8; 710/8; 710/62; 710/102; 710/104; 713/100
(58) Field of Search .................................. 710/8, 9, 104, 710/2, 22, 38, 62, 102; 713/1, 100; 714/5

(56) References Cited

U.S. PATENT DOCUMENTS

| | | | | |
|---|---|---|---|---|
| 5,161,102 | * | 11/1992 | Griffin et al. | 710/104 |
| 5,367,640 | * | 11/1994 | Hamilton et al. | 710/9 |
| 5,634,075 | * | 5/1997 | Smith et al. | 710/9 |
| 5,935,228 | * | 8/1999 | Shinomura | 710/102 |
| 5,974,554 | * | 10/1999 | Oh | 713/300 |
| 6,119,185 | * | 9/2000 | Westerinen et al. | 710/104 |
| 6,145,021 | * | 11/2000 | Dawson, III et al. | 710/8 |
| 6,154,836 | * | 11/2000 | Dawson, III et al. | 713/1 |

OTHER PUBLICATIONS

"Automatic Configuration of a Personal Computer System" IBM Technical Disclosure Bulletin, Sep. 1989, pp. 112–115.*

* cited by examiner

Primary Examiner—Thomas Lee
Assistant Examiner—Chun Cao
(74) Attorney, Agent, or Firm—Bacon & Thomas, PLLC

(57) ABSTRACT

The present invention relates to a sound blaster interface card auto-detection method, which is applicable to all kinds of brands of sound blaster interface card supplied in the market. The present invention enables a computer system to automatically detect the indexes of the Connecting Port (PORT or Base Port), Interrupt Request (IRQ) and Direct Memory Access Channel (DMA) of a sound blaster interface card inserted therein and to activate the sound blaster interface card after receiving said indexes.

3 Claims, 1 Drawing Sheet

SOUND BLASTER INTERFACE CARD AUTO-DETECTION METHOD

BACKGROUND OF THE INVENTION

The present invention relates to a method enabling the computer system to auto-detect the indexes of a sound blaster interface card and to activate said card disregarding its brand, model and manufacturer.

PRIOR ART OF THE INVENTION

As already known, there are many brands and models of sound blaster interface cards in the market, but there isn't a consistent detection method for the variety of sound blaster interface cards so far. Therefore, different sound blaster interface cards have to be respectively detected by different detection methods, which causes confusion to the computer system in selecting a suitable detection method. For instance, while a sound blaster interface card being inserted into a computer, said computer has to find out the brand of said sound blaster interface card by using different methods to detect the indexes thereof. Under such a condition, erroneous detection might occur and the computer might be abnormally downed. To overcome this problem, there has to be added a selection to the computer system for manual setting the required indexes. This is not only a troublesome procedure but the user has to be familiar with the values and correct meanings of the indexes to go through all the steps of the manual setting correctly. Therefore, it is rather crucial for most users to detect the sound blaster interface card manually and correctly.

Besides, to obtain the indexes of the connection port (PORT or Base Port), Interrupt Request (IRQ) and Direct Memory Access Channel (DMA) of the sound blaster interface card, the users have to find out the manufacturer, model and specifications thereof. In addition, in order to let the computer system be capable of handling various sound blaster interface cards, the users have to know all the detection methods of the various interface cards while not all the interface cards provide this information. Even though the users do know the detection method, they also have to find out the exact model of the card so as to be able to apply the detection method correctly, otherwise the they will face erroneous detection and even causing the computer to go down.

SUMMARY OF THE INVENTION

In order to solve the above problems and troubles, the inventor, having years of experiences in the industries, plus numerous researches, studies, developments and testing, worked out successfully and finally the present invention.

The primary aspect of the present invention is to provide an auto-detection method to detect the indexes of all kinds of sound blaster interface cards. By using the method of the present invention will let the computer system obtain the indexes of sound blaster interface card required for running an application program and stabilize the working system thereof. The method of the present invention is based on the standards in a sound blaster interface card, namely "SoundBlaster 2.0", manufactured by CREATIVE Corporation (Hereinafter referred as "SB2.0"). And, the present invention enables the computer system utilize the characteristics of the sound blaster interface card set forth within this standards to auto-detect three major indexes (i.e. connection port (PORT or Base Port), Interrupt Request (IRQ) and Direct Memory Access Channel (DMA) etc.) of the sound blaster interface card.

BRIEF DESCRIPTION OF THE DRAWINGS

In order to let the characteristics and functions of the present invention being easily and clearly understood, the detailed description along with the drawings are shown as follows.

Figure 1:
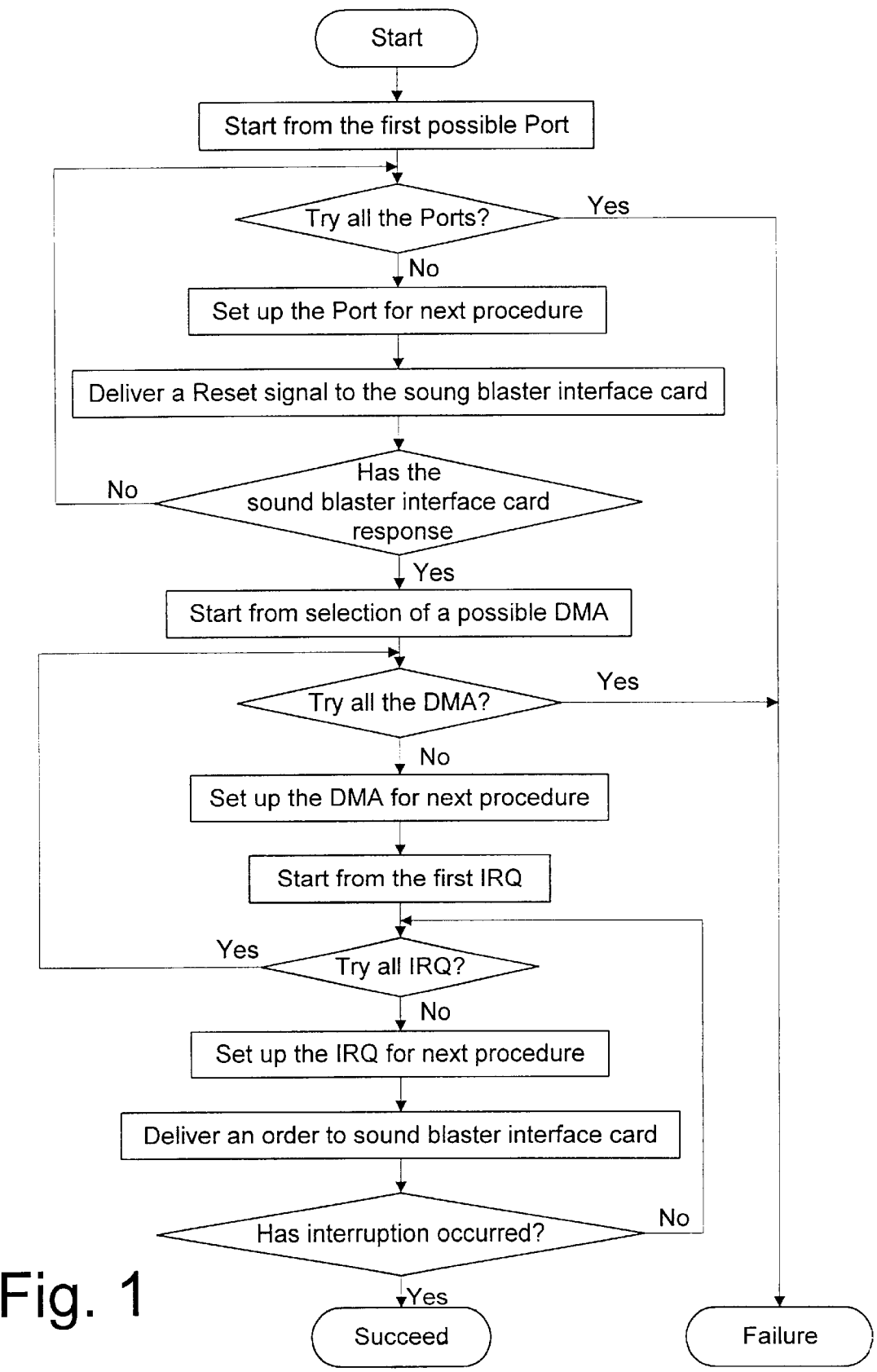
FIG. 1 is a flow chart of the present invention.

Table 1 is a table list of the ports being normally used by a sound blaster interface card to connect with a computer system;

Table 2 is a table list of the DMA channels being used by a sound blaster interface card;

Table 3 is a table list of the Interrupt Request (IRQ) being used by a sound blaster interface card.

DETAILED DESCRIPTION OF THE PREFERRED EMBODIMENT

The present invention is a method of sound blaster interface card auto-detection, of which the concept is based on the standards in a sound blaster interface card, namely "SoundBlaster 2.0", manufactured by CREATIVE Corporation (Hereinafter referred as "SB2.0"). By utilizing the specific characteristics and PC compatible characteristics set forth within the standards, the method of the present invention enables a computer system to automatically detect the required indexes of a sound blaster interface card inserted in the computer system. The required indexes mainly include the connection Port (PORT or Base Port), Interrupt Request (IRQ) and Direct Memory Access Channel (DMA) etc. The computer system can then transmit the information obtained from these indexes to the application system (such as Multi media broadcasting system) to activate the sound blaster interface card.

The standards set in SB2.0 regulate the computer system to deliver a Reset instruction to the sound blaster interface card while the later will response with an "Acknowledgement". So during the detection, the computer utilizes the characteristic of said instruction to check the possible connection ports one after another by sending out a Reset signal to each port. When the connection port replies to said Reset signal with a response of "acknowledgement", the computer will then identify this Port as the Port for the sound blaster interface card.

In addition, the standards in SB2.0 also regulate that, every time when the sound blaster interface card playing or recording the digital data stored in a buffer by using a Direct Memory Access is completed, the sound blaster interface card will be requested to send out an interrupt signal. So during the detection, the computer system will utilize this specific characteristic to check the possible connection ports one after another by assigning the signals of Direct Memory Access (DMA) and Interrupt Request (IRQ) to the card on each port. If the DMA or IRQ is incorrect, the sound blaster interface card will not send out an interrupt signal. If the sound blaster interface card sends out an interrupt signal, it means that the DMA and IRQ assigned therein are exactly the correct DMA and IRQ required for the sound blaster interface card.

Besides, in general, when a computer system is connected with its peripherals, the computer system will set up the positions of the connection port, output/input access and Interrupt Request (IRQ) for the peripherals. The ports being normally used by a sound blaster interface card to connect with a computer system are shown in Table 1.

The DMA channels and Interrupt Request (IRQ) being used by a sound blaster interface card are respectively shown in Table 2 and 3.

Referring to FIG. 1, when a sound blaster interface card being inserted in a computer system, the computer system will select a first possible connection port from the above ports for the sound blaster interface card and presume that the connection port selected is a correct port. After that, the computer system will transmit a Reset signal to the sound blaster interface card and judge whether there is no response of "Acknowledgement" feed back to the computer. If the computer doesn't receive a response of "Acknowledgement" from the sound blaster interface card, the computer system will select the next possible port and repeat the above mentioned procedures until all the applicable sound blaster interface cards inserted in the ports are detected.

If the computer does receive a response of "Acknowledgement" from the selected sound blaster interface card, which means the connection Port selected is a correct one. The computer then proceeds with the Direct Memory Access Channel (DMA channel) selection procedures to select a first possible DMA channel, and presume the one being selected as a correct one. And then, the computer proceeds with the Interrupt Request selection procedures to select a first possible Interrupt Request and presume the one selected is correct. The computer system then delivers a play instruction to the sound blaster interface card and judge if there is any Interruption being sent back. If there is an Interruption being detected, it means the detection of the present invention is successfully completed.

If there isn't any Interruption being detected, it means that the play action of the sound blaster interface card is not successfully played back. At this moment, the present invention will repeat the IRQ selection procedures to select the next IRQ until all the IRQ selection is completed. In case it still could not locate the correct one, it will then start the Direct Memory Access Channel (DMA channel) selection procedures again from the next DMA Channel along with the Interrupt Request selection procedures until the DMA Channel selection is completed.

When all the above procedures are completed, the indexes of the connection Port (PORT or Base Port), Interrupt Request (IRQ) and Direct Memory Access Channel (DMA Channel) of the sound blaster interface card will be transmitted to the relevant application system (such as multi media broadcasting system). Enabling the application system to activate the sound blaster interface card without the driving software of the sound blaster interface card.

Since the concept of the present invention is based on the SB2.0 standards, it will let the sound blaster interface card normally work during the detection and has very good compatibility in detecting all kinds of sound blaster interface cards which meet SB2.0 edition and/or above standards.

It is to be understood that changes may be made to the present invention in light of the above detailed description. Accordingly, the invention is not limited by the disclosure, but instead its scope is to be determined entirely by reference to the following claims.

TABLE 1

| Port Address (16 bytes) |
| --- |
| 220 H |
| 230 H |
| 240 H |
| 250 H |
| 260 H |
| 280 H |

TABLE 2

| DMA channels | Functions |
| --- | --- |
| 0 | Direct memory renew |
| 1 | Applicable |
| 2 | Soft diskette driver |
| 3 | Applicable |
| 4 | Retained |
| 5 | Retained |
| 6 | Retained |
| 7 | Retained |

TABLE 3

| IRQ | Functions |
| --- | --- |
| 0 | Timer of system |
| 1 | Keyboard |
| 2 | Connect to another interrupt controller/applicable |
| 3 | COM2/applicable |
| 4 | COM1/applicable |
| 5 | Second printer(LPT2)/applicable |
| 6 | Soft diskette driver |
| 7 | First printer(LPT1)/applicable |
| 8 | Real-time timer |
| 9 | Software reset to IRQ2 |
| 10 | Applicable |
| 11 | Applicable |
| 12 | PS/2 mouse |
| 13 | digital processor errors |
| 14 | Major drive controller |
| 15 | Second drive controller |

What the invention claimed is:

1. The Auto-Detection method of sound blaster interface card, which enabling a computer system to automatically detect the indexes required for a sound blaster interface card being connected with said computer in a normal operation circumstance, comprising the steps of:

(1) selecting a possible connection port for said sound blaster interface card, presuming said port selected is the correct one, delivering a Reset signal to said card, checking if an "Acknowledgement" being sent back from said card, and identifying said port selected as the correct port when said "Acknowledgement" being received;

(2) selecting a possible Direct Memory Access (DMA) channel and presuming said channel selected is the correct one when the correct connection port being detected, then selecting a possible Interrupt Request (IRQ) and presuming said Interrupt Request (IRQ) selected is the correct one, delivering a play instruction to said card and checking if an Interruption being sent back from said card, and identifying the detection of said card being successfully completed when receiving an Interruption;

(3) otherwise, selecting the next possible Direct Memory Access (DMA) Channel and presuming said channel is the correct one, then again selecting a possible Interrupt Request (IRQ) and presuming said Interrupt Request selected is correct, delivering a play instruction to said card and checking if an Interruption being sent back from said card, and identifying the detection of said card being successfully completed when receiving an Interruption.

2. The method of claim 1 further comprising the step of selecting the next possible port and repeating the connection port selection procedures, when no "Acknowledgement" response being received, until all the possible connection ports being detected.

3. The method of claim 1 further comprising the step of selecting the next Interrupt Request (IRQ) and repeating the Interrupt Request (IRQ) selection procedures, when no interruption being received, until all the Interrupt Request (IRQ) selection being completed.

* * * * *